US012781790B2

(12) United States Patent
Song et al.

(10) Patent No.: US 12,781,790 B2
(45) Date of Patent: Nov. 3, 2026

(54) ROTATIONAL JOINT AND DEVICE HAVING SAME

(71) Applicant: SHANGHAI FLEXIV ROBOTICS TECHNOLOGY CO., LTD., Shanghai (CN)

(72) Inventors: Tingke Song, Santa Clara, CA (US); Ran An, Santa Clara, CA (US); Xuan Wang, Shanghai (CN); Poyen Chen, Santa Clara, CA (US)

(73) Assignee: SHANGHAI FLEXIV ROBOTICS TECHNOLOGY CO., LTD., Shanghai (CN)

( * ) Notice: Subject to any disclaimer, the term of this patent is extended or adjusted under 35 U.S.C. 154(b) by 211 days.

(21) Appl. No.: 18/725,604

(22) PCT Filed: Dec. 7, 2022

(86) PCT No.: PCT/CN2022/137226
§ 371 (c)(1),
(2) Date: Jun. 28, 2024

(87) PCT Pub. No.: WO2023/124856
PCT Pub. Date: Jul. 6, 2023

(65) Prior Publication Data

US 2025/0067302 A1 Feb. 27, 2025

(30) Foreign Application Priority Data

Dec. 30, 2021 (CN) ......................... 202111654607.8
Dec. 30, 2021 (CN) ......................... 202123401562.1

(51) Int. Cl.
*G01P 3/487* (2006.01)
*F16C 11/04* (2006.01)
*G01P 3/56* (2006.01)

(52) U.S. Cl.
CPC .............. *F16C 11/04* (2013.01); *G01P 3/487* (2013.01); *G01P 3/56* (2013.01)

(58) Field of Classification Search
CPC ............. G01D 2205/26; G01D 5/2451; G01D 5/245–2458; G01P 3/4802; G01P 3/487; G01P 3/56
See application file for complete search history.

(56) References Cited

U.S. PATENT DOCUMENTS 4,749,898 A * 6/1988 Suzuki ................ H10P 72/0444
376/104
6,088,202 A 7/2000 Kabasawa et al.
(Continued)

FOREIGN PATENT DOCUMENTS

CN 107127786 A 9/2017
CN 108638096 A 10/2018
(Continued)

OTHER PUBLICATIONS

Office action issued in Chinese Patent Application No. 2021116546078 dated Sep. 27, 2024, along with English translation thereof.
(Continued)

*Primary Examiner* — Kenneth L Thompson
(74) *Attorney, Agent, or Firm* — GREENBLUM & BERNSTEIN, P.L.C.

(57) ABSTRACT

The present application relates to a rotational joint and a device having the same. The rotational joint includes a joint housing, a driving device mounted in the joint housing, and an encoder module mounted on the driving device. The driving device includes inner shaft and an outer shaft surrounding the inner shaft and radially spaced apart from the inner shaft. The encoder module includes a first disk assembly configured to rotate synchronously with the outer shaft, a second disk assembly configured to rotate synchronously with the inner shaft, a first sensor assembly disposed
(Continued)

adjacent to the first disk assembly to detect movement of a disk of the first disk assembly, and a second sensor assembly disposed adjacent to the second disk assembly to detect movement of a disk of the second disk assembly. A disk surface of the first disk assembly and a disk surface of the second disk assembly are arranged to be coplanar and radially spaced apart by at least a predetermined distance. The device includes at least one rotational joint.

19 Claims, 4 Drawing Sheets

(56) References Cited

U.S. PATENT DOCUMENTS

| | | | | |
|---|---|---|---|---|
| 9,534,931 | B2 * | 1/2017 | Ueda | H02K 11/21 |
| 10,557,707 | B2 * | 2/2020 | Omata | H02K 7/116 |
| 11,874,143 | B2 * | 1/2024 | Coyne | G01D 5/58 |
| 2003/0094568 | A1 | 5/2003 | Meschko | |
| 2009/0145256 | A1 | 6/2009 | Reiss | |

FOREIGN PATENT DOCUMENTS

| | | | |
|---|---|---|---|
| CN | 109366480 | A | 2/2019 |
| CN | 110039569 | A | 7/2019 |
| CN | 110160560 | A | 8/2019 |
| CN | 110730707 | A | 1/2020 |
| CN | 211841996 | U | 11/2020 |
| CN | 212435537 | U | 1/2021 |
| CN | 112917508 | A | 6/2021 |
| CN | 213971276 | U | 8/2021 |
| CN | 214265646 | U | 9/2021 |
| CN | 113799169 | A | 12/2021 |
| CN | 114193507 | A | 3/2022 |
| CN | 216682262 | U | 6/2022 |
| JP | 2012-16799 | A | 1/2012 |
| JP | 2016-166879 | A | 9/2016 |
| WO | 2017013451 | A1 | 1/2017 |
| WO | 2021115805 | A1 | 6/2021 |

OTHER PUBLICATIONS

First Office Action in related Chinese Application No. 202111654607, issued May 30, 2024, 11 pages.
International Search Report and Written Opinion in related PCT Application No. PCT/CN2022/137226, issued Feb. 22, 2023, 13 pages.
Extended European Search Report issued in the European Patent Appl. No. 22914111.4 dated Jan. 27, 2025.
Office action issued in the related Japanese Patent Appl. No. 2024539709 dated May 20, 2025, along with English translation thereof.
Decision to Grant issued in the corresponding Chinese Patent Appl. No. 202111654607.8, Sep. 10, 2025.

* cited by examiner

ROTATIONAL JOINT AND DEVICE HAVING SAME

CROSS-REFERENCE TO RELATED APPLICATIONS

This application is an U.S. national phase application under 35 U.S.C. § 371 based upon international patent application No. PCT/CN2022/137226, filed on Dec. 7, 2022, which itself claims priority to Chinese Invention patent application No. 2021116546078, filed on Dec. 30, 2021, entitled "ENCODER MODULE FOR ROTATIONAL JOINT, ROTATIONAL JOINT, ROBOTIC ARM AND ROBOT", and Chinese Utility Model patent application No. 2021234015621, filed on Dec. 30, 2021, entitled "JOINT FOR ROBOT AND ROBOTIC ARM AND ROBOT HAVING THE SAME", which are hereby incorporated herein in their entireties by reference.

TECHNICAL FIELD

The present application relates to the field of robots, and in particular to a rotational joint for a robot and a device having the rotational joint, such as a robotic arm and a robot.

BACKGROUND

In general, robots with robotic arms rely on joints to control the relative motion between components of the robotic arm. The joints are usually divided into rotational joints and translational joints (also known as mobile joints). The rotational joints may be respectively connected to two components to rotate by a driving device, so as to generate relative motion between the two components. In order to precisely control the movement and position of the robotic arm, it is necessary to accurately measure a rotational speed of two output shafts of the driving device and adjust the rotational speed of each output shaft according to the measured rotational speed.

Typically, encoders are used to measure the rotational speed of the two output shafts of the driving device. The encoder is a device that converts a signal into a sinusoidal wave by magnetic or optical measuring principles. Magnetic encoders can achieve a resolution as low as 1 micron, which are resistant to vibration, pollution and corrosion from dust, oil, water vapor, salt spray, etc., and are more durable than optical encoders. Therefore, the magnetic encoders are widely used in the field of robots where precise control of motion positions is required.

The magnetic encoder includes a disk, a sensor, and a conditioning circuit. The disk is magnetized, and many magnetic poles are distributed on its circumference, and two adjacent magnetic poles have opposite polarities. The sensor is configured to detect changes in the magnetic field as the disk spins and convert the information into a sine wave. The sensor can be a Hall-effect device, which senses a change in voltage, or a magnetoresistive device, which senses a change in a magnetic field. The conditioning circuit multiplies, divides or interpolates the signal to produce a desired output.

In the joint of the robot, the two output shafts of the driving device are usually located on both sides of the driving device, and correspondingly, two sets of magnetic encoder modules are also located on both sides of the driving device. Each magnetic encoder module has the disk and a PCB circuit board with a sensor chip, each disk is fixed to the corresponding output shaft, and the corresponding PCB circuit board is mounted to remain fixed relative to the driving device.

SUMMARY

According to an aspect of the present application, a rotational joint is provided. The rotational joint includes a joint housing, a driving device mounted in the joint housing, and an encoder module mounted on the driving device, the driving device includes an inner shaft and an outer shaft surrounding the inner shaft and radially spaced apart from the inner shaft. The encoder module includes: a first disk assembly configured to rotate synchronously with the outer shaft: a second disk assembly configured to rotate synchronously with the inner shaft: a first sensor assembly disposed adjacent to the first disk assembly to detect movement of a disk of the first disk assembly; and a second sensor assembly disposed adjacent to the second disk assembly to detect movement of a disk of the second disk assembly. A disk surface of the first disk assembly and a disk surface of the second disk assembly are arranged to be coplanar and radially spaced apart by at least a predetermined distance.

In at least one embodiment according to the present application, the encoder module further includes: a first connecting shaft having a first end and a second end, the first end of the first connecting shaft being configured to be connected to a tail end of the outer shaft: a second connecting shaft having a first end and a second end, the first end of the second connecting shaft being configured to be fixedly connected to the inner shaft; and a bearing mounted between the first connecting shaft and the second connecting shaft. The first disk assembly is fixed to the first connecting shaft, and the second disk assembly is fixed to the second connecting shaft.

In at least one embodiment according to the present application, the first connecting shaft is a hollow shaft and a first bearing positioning shoulder is formed on an inner periphery surface of the first connecting shaft, and/or a second bearing positioning shoulder is formed on an outer periphery surface of the second connecting shaft.

In at least one embodiment according to the present application, a first connection positioning shoulder is formed on an inner peripheral surface of the first end of the first connecting shaft or an outer peripheral surface of the first end of the first connecting shaft, and is configured to position a mounting position of the first connecting shaft relative to the outer shaft.

In at least one embodiment according to the present application, an additional module positioning shoulder is formed on the outer peripheral surface of the first connecting shaft.

In at least one embodiment according to the present application, a second connection positioning shoulder is formed on the outer peripheral surface of the second connecting shaft or an end surface of the first end of the second connecting shaft, and is configured to position a mounting position of the second connecting shaft relative to the inner shaft.

In at least one embodiment according to the present application, the inner shaft is a hollow shaft and extends a certain length from the outer shaft, the second connecting shaft is a hollow shaft, a second connection positioning shoulder and/or a disassembly auxiliary shoulder is formed on the inner peripheral surface thereof, the second connection positioning shoulder is configured to position a mounting position of the second connecting shaft relative to the inner shaft, and the disassembly auxiliary shoulder is configured to separate the second connecting shaft from the inner shaft.

In at least one embodiment according to the present application, an end surface of the second end of the first connecting shaft is coplanar with an outer end surface of the bearing, and an end surface of the second end of the second connecting shaft is coplanar with the disk surface of the first disk assembly and the disk surface of the second disk assembly.

In at least one embodiment according to the present application, the bearing is bonded to at least one of the first connecting shaft and the second connecting shaft by an adhesive.

In at least one embodiment according to the present application, the bearing is a deep groove ball bearing, and an inner ring of the bearing is bonded to the second connecting shaft by an adhesive.

In at least one embodiment according to the present application, the encoder module further includes a PCB circuit board on which the first sensor assembly and the second sensor assembly are mounted, the PCB circuit board is parallel to and spaced apart from the disk surface of the first disk assembly and the disk surface of the second disk assembly.

In at least one embodiment according to the present application, the PCB circuit board is fixed to at least one of an inner wall, an outer wall, and an end surface of an end of the joint housing, and the PCB circuit board is spaced apart from the end of the joint housing by a predetermined distance. The predetermined distance is at least greater than a total thickness of the first disk assembly and the second disk assembly.

In at least one embodiment according to the present application, the PCB circuit board is directly fixed to the joint housing through at least one spacer post, and each end of each spacer post is formed with an internal thread or an external thread.

In at least one embodiment according to the present application, the joint housing includes at least one boss provided on at least one of an inner wall, an outer wall and/or an end surface of the end of the joint housing and a threaded fastener threaded to the boss, the one boss extends a predetermined distance relative to the end of the joint housing, and each boss is provided with a threaded hole, and the PCB circuit board is connected and fixed to the joint housing through a combination of the threaded fastener and the boss.

In at least one embodiment according to the present application, the PCB circuit board has a central hole for a cable to extend through.

In at least one embodiment according to the present application, the first sensor assembly and/or the second sensor assembly include a sensor and a conditioning circuit integrated into a chip, wherein the sensor is a Hall sensor or a giant magnetoresistive sensor.

In at least one embodiment according to the present application, the first disk assembly includes a first disk and a first mounting bracket supporting the first disk, the first mounting bracket may be mounted to the second end of the first connecting shaft.

In at least one embodiment according to the present application, the second disk assembly includes a second disk and a second mounting bracket supporting the second disk, and the second mounting bracket may be mounted to the second end of the second connecting shaft.

In at least one embodiment according to the present application, the first mounting bracket is separated from the second mounting bracket axially and radially. The first mounting bracket and the first connecting shaft are separately or integrally formed, and the second mounting bracket and the second connecting shaft are separately or integrally formed.

In at least one embodiment according to the present application, an outer ring and/or an inner ring of the first disk may be fixed to the first mounting bracket. An outer ring and/or an inner ring of the second disk may be fixed to the second mounting bracket.

In at least one embodiment according to the present application, the driving device includes a motor and a transmission device driven by the motor, wherein the motor drives one of the inner shaft and the outer shaft, the transmission device drives the other of the outer shaft and the inner shaft In at least one embodiment according to the present application, the driving device is mounted in the joint housing, and the encoder module extends a predetermined length relative to an end of the joint housing.

In at least one embodiment according to the present application, the rotational joint further includes a control device configured to adjust an operation of the driving device based on signals output by the first sensor assembly and the second sensor assembly.

According to another aspect of the present disclosure, a device is provided, which includes at least one rotational joint as described above.

In at least one embodiment according to the present application, the device includes a robot or a robotic arm, etc.

BRIEF DESCRIPTION OF THE DRAWINGS

In order to illustrate the embodiments of the present application more clearly, the drawings used in the embodiments or conventional technologies will be described briefly. Apparently, the drawings described below are merely for the embodiments of the present application, and other drawings can be derived from the drawings of the present application by an ordinary person skilled in the art without any creative effort.

DETAILED DESCRIPTION OF THE EMBODIMENTS

Figure 1:
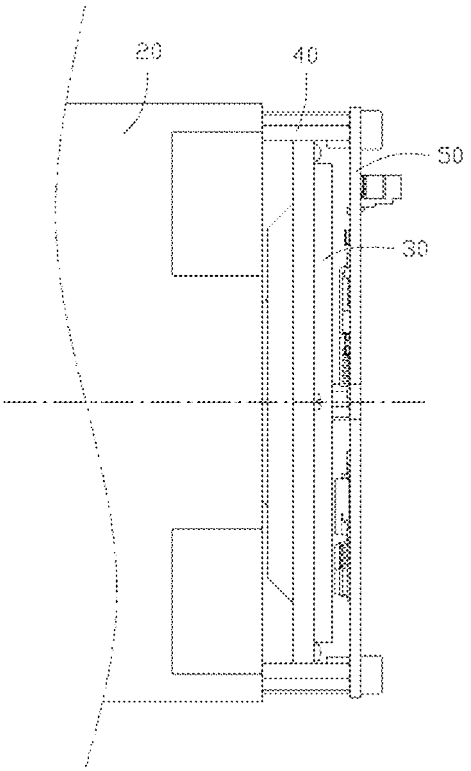
FIG. 1 schematically shows a partial front view of a structure and a mounting method of an encoder module in a joint according to an embodiment of the present application.

The technical solution in the embodiment of the present application will be clearly and completely described below in conjunction with the drawings in the embodiment of the application. Apparently, the described embodiments are only some of the embodiments of the application, not all of them. Based on the embodiments in the present application, all other embodiments obtained by an ordinary person skilled in the art without making creative efforts shall all fall within the protection scope of the present application.

Specific embodiments of the present application will be described in details below with reference to accompanying FIGS. 1 to 5.

As shown in FIGS. 1 to 5, according to an embodiment of the present application, a rotational joint includes a driving device (not shown), a joint housing 20, and an encoder assembly 30. The driving device is fixedly mounted in the joint housing 20 and has two shafts, namely an outer shaft 11 and an inner shaft 12, which extends towards the same side of the driving device and rotates about the same axis. The outer shaft 11 is a hollow shaft surrounding the inner shaft 12 and radially spaced from the inner shaft 12. Thereby, the inner shaft 11 and the outer shaft 12 rotate independently of each other.

The encoder assembly 30 includes a disk assembly and a sensor assembly. The sensor assembly may be mounted on a PCB circuit board 50, and the PCB circuit board 50 may be mounted perpendicular to an axis of an output of the driving device. Specifically, the disk assembly includes a first disk assembly 31 that rotates synchronously with the outer shaft 11 and a second disk assembly 32 that rotates synchronously with the inner shaft 12. The sensor assembly includes a first sensor assembly (not shown) configured to detect a change in the magnetic field of the first disk assembly 31 due to rotation, and a second sensor assembly (not shown) configured to detect a change in the magnetic field of the second disk assembly 32 due to rotation.

The PCB circuit board 50 is mounted to be fixed relative to the driving device, for example, to be fixed to the joint housing 20 through a connection assembly 40. In an embodiment, the PCB circuit board is mounted parallel to and spaced apart from a disk of the disk assembly, e.g., the PCB circuit board is connected to an end of the joint housing 20 while being spaced apart from the end of the joint housing 20 by a predetermined distance. Although the first sensor assembly and the second sensor assembly can be mounted to different circuit boards, it is desired in this application that they are mounted to the same PCB circuit board 50, which helps to save a mounting space of the PCB circuit board and simplify the mounting.

The sensor assembly may be a sensor chipset, such as a Hall sensor chipset or a giant magnetoresistive chipset. A chip in each sensor assembly is integrated with a signal processing circuit. The signal processing circuit processes an electrical signal sensed based on the sensor in the sensor assembly to output a digital signal related to a rotational speed to a control device of at least one of the joint, a robotic arm including the joint, and the robot including the joint. The control device can adjust an output speed of the driving device according to a predetermined program based on the received digital signal, or correct the output speed of the driving device according to a resulting error. The error herein refers to a difference between a measured rotational speed and an expected rotational speed.

Figure 2:
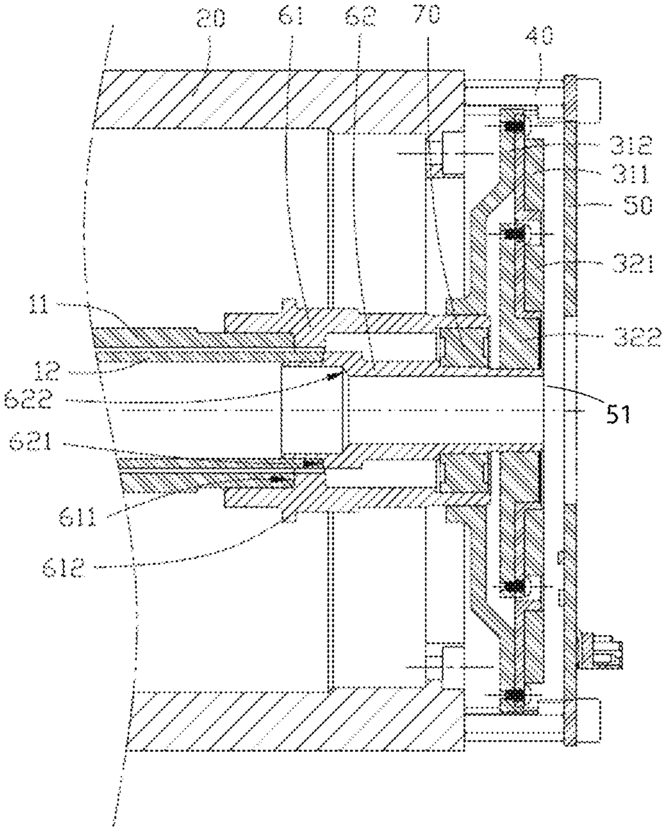
FIG. 2 is a partial cross-sectional view schematically showing a structure of an encoder module in a rotational joint according to an embodiment of the present application.

The driving device is mounted and fixed in the joint housing 20, which may be in various configurations such as dual motors, dual shaft motors or motor and transmission systems. The motor and transmission system includes a motor and a transmission device, the transmission device may be driven by the motor and may be a reducer, a variator or a speed-up device. As shown in FIGS. 1 and 2, the driving device has two concentrically rotating shafts, namely the outer shaft 11 and the inner shaft 12, which extend towards a same side. For example, the motor drives the outer shaft 11 to rotate, and the transmission device drives the inner shaft 12 to rotate. The outer shaft 11 may be a driving shaft of the rotational joint, for example, the outer shaft 11 may be an output shaft of a motor of the rotational joint. The inner shaft 12 may be an output shaft of the rotational joint or be connected to the output shaft of the rotational joint or be a portion of the output shaft of the rotational joint. The outer shaft 11 surrounds the inner shaft 12 and is radially spaced from the inner shaft 12, so that the outer shaft 11 and the inner shaft 12 can rotate independently of each other.

Figure 3:
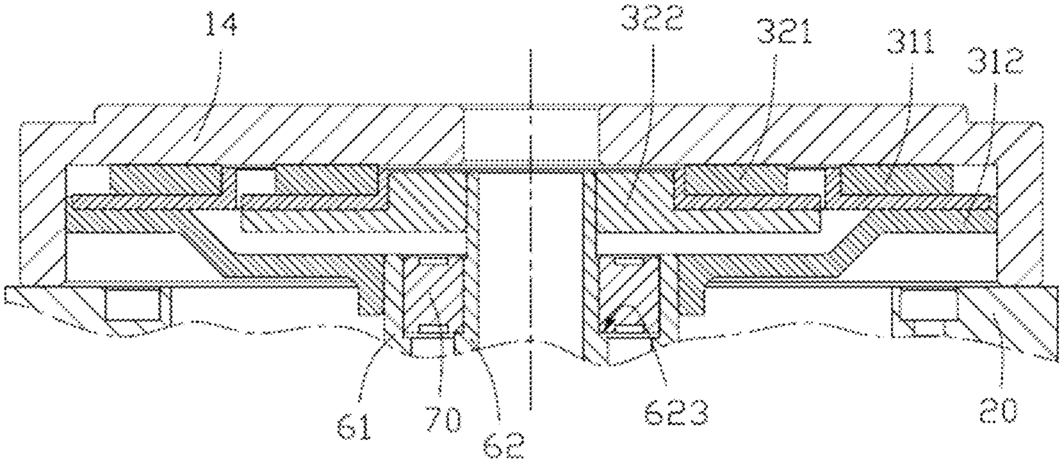
FIG. 3 is a partial cross-sectional view schematically showing a structure and a mounting method of a disk assembly of an encoder module in a rotational joint according to an embodiment of the present application.
Figure 4:
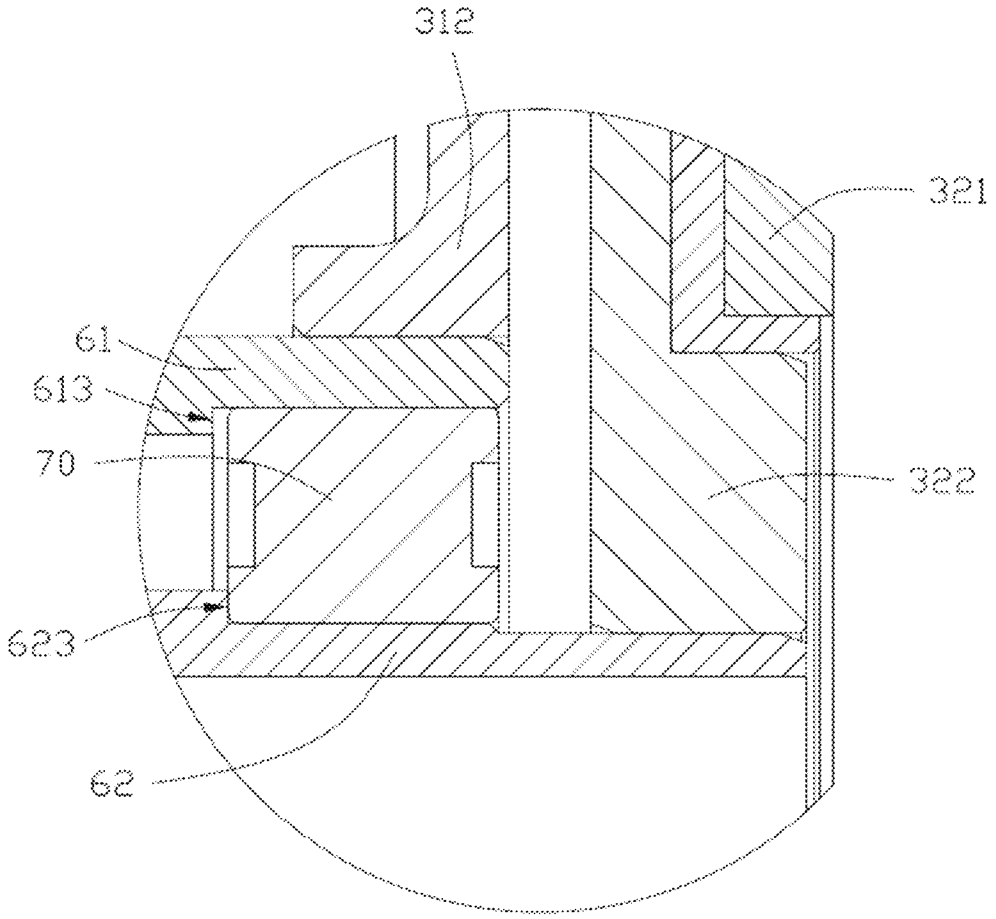
FIG. 4 is a cross-sectional view schematically showing a partial mounting structure of two disk assemblies of an encoder module in a rotational joint according to an embodiment of the present application.
Figure 5:
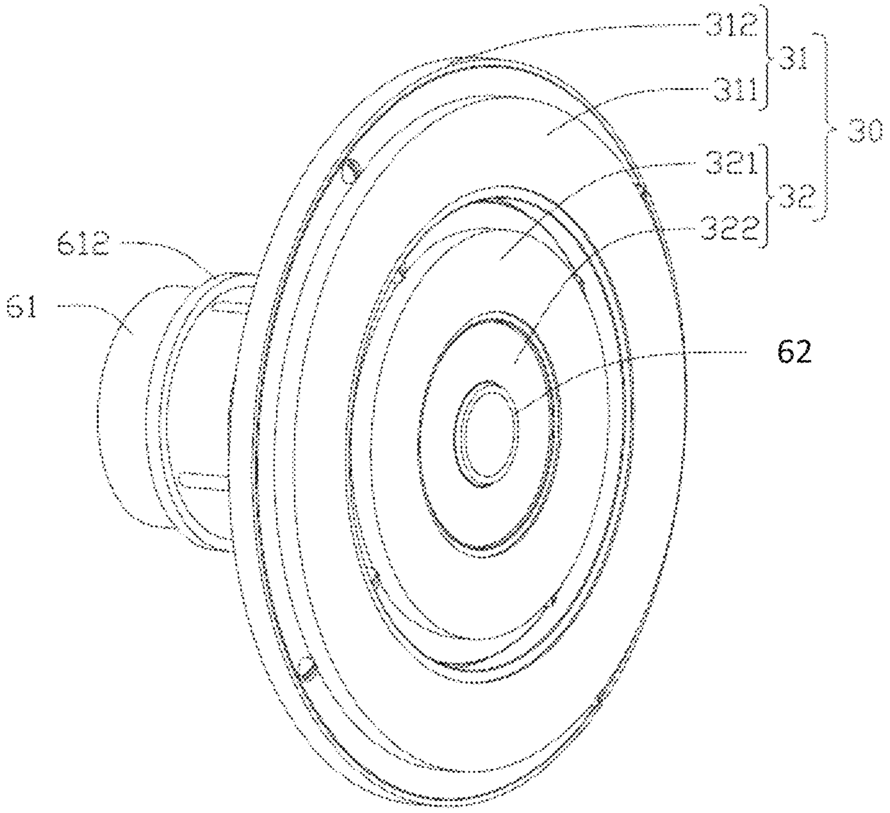
FIG. 5 is a perspective view schematically showing a combined structure of a disk assembly and a connecting shaft in an encoder module according to an embodiment of the present application.

In an embodiment, a length of the outer shaft 11 extending from the driving device is shorter than a length of the inner shaft 12 extending from the driving device, that is, as shown in FIGS. 1 to 3, the outer shaft 11 is a hollow shaft, and the inner shaft 12 extends a certain length from a tail end of the hollow outer shaft 11. Obviously, as shown in FIGS. 1 to 3, the inner shaft 12 can also be designed as a hollow shaft, which not only can reduce a weight of the inner shaft, but also can be used as a wire passing shaft of the rotational joint. If necessary, the inner shaft 12 can also be designed as a solid shaft, or the inner shaft 12 can be designed such that a tail end thereof does not exceed the tail end of the outer shaft 11.

The tail end of the outer shaft 11 is connected to a first connecting shaft 61, and the tail end of the inner shaft 12 is connected to a second connecting shaft 62. The first connecting shaft 61 is configured to mount the first disk assembly 31, and the second connecting shaft 62 is configured to mount the second disk assembly 32.

A mounting structure for mounting the encoder assembly 30 by using the first connecting shaft 61 and the second connecting shaft 62 to monitor a driving shaft and an output shaft of the rotational joint will be described in details below with reference to FIGS. 1 to 5.

The first connecting shaft 61 is a hollow shaft, and the second connecting shaft 62 is also a hollow shaft. At any position in an axial direction, an outer diameter of the second connecting shaft 62 is less than an inner diameter of the first connecting shaft 61, that is, the first connecting shaft 61 is located radially outside the second connecting shaft 62. That is, the second connecting shaft 62 is located in a hollow portion of the first connecting shaft 61, and is surrounded by the hollow first connecting shaft 61, and the two are spaced apart radially.

The first connecting shaft 61 has a first end fixedly connected to the tail end of the outer shaft 11 and a second end configured to mount the first disk assembly 31. The second connecting shaft 62 has a first end fixedly connected to the tail end of the inner shaft 12 and a second end configured to mount the second disk assembly 32. The first connecting shaft 61 and the outer shaft 11 may be connected by an interference fit, and the second connecting shaft 62 and the inner shaft 12 may also be connected by an interference fit. In addition, if necessary, an adhesive may be applied between the first connecting shaft 61 and the outer shaft 11 and/or between the second connecting shaft 62 and the inner shaft 12.

In this way, the first connecting shaft 61, the outer shaft 11, and the first disk assembly 31 rotate synchronously, and a rotation speed of the first disk assembly 31 is a rotation speed of the driving shaft of the rotational joint. The second connecting shaft 62, the inner shaft 12, and the second disk assembly 32 rotate synchronously, and a rotation speed of the second disk assembly 32 is a rotation speed of the output shaft of the rotational joint.

A bearing 70, such as a deep groove ball bearing, is mounted between the first connecting shaft 61 and the second connecting shaft 62. An outer ring of the bearing 70 is in contact with an inner surface of the first connecting shaft 61, and an inner ring of the bearing 70 is in contact with an outer surface of the second connecting shaft 62. According to an embodiment of the present application, the bearing 70 is mounted to the second end of the first connecting shaft 61, an end surface of one end of the bearing 70 is coplanar with an end surface of the second end of the first connecting shaft 61, and the other end of the bearing 70 abuts against a bearing positioning shoulder 623 formed on the outer surface of the second connecting shaft 62. A bearing positioning shoulder 613 may also be formed on the inner surface of the first connecting shaft 61. In order to enable the bearing 70 to be firmly connected to the first connecting shaft 61 and the second connecting shaft 62, an adhesive, such as 609 glue, may further be applied between the first connecting shaft 61 and the outer ring of the bearing and between the second connecting shaft 62 and the inner ring of the bearing 70. In order to ensure firm mounting, the bearing 70 and the first connecting shaft 61 and the second connecting shaft 62 may be preferably connected by an interference fit.

In addition, as shown in FIGS. 1 to 3, a first connection positioning shoulder 611 is further formed on an inner peripheral surface of the first end of the first connecting shaft 61, and the first connection positioning shoulder 611 is configured to position the mounting position of the first connecting shaft 61 relative to the outer shaft 11. A second connection positioning shoulder 621 is further formed on an outer peripheral surface or the end surface of the first end of the second connecting shaft 62, and the second connection positioning shoulder 621 is configured to position the mounting position of the second connecting shaft 62 relative to the inner shaft 12. As shown in FIGS. 1 and 2, when the first connecting shaft 61 is mounted in place, the tail end of the outer shaft 11 abuts against the first connection positioning shoulder 611, and when the second connecting shaft 62 is mounted in place, the tail end of the inner shaft 12 abuts against the second connection positioning shoulder 621.

However, the present application is not limited thereto. In the case where the dimensions of the outer shaft 11 and the inner shaft 12 are suitable, the first connection positioning shoulder 611 may also be formed on an outer peripheral surface of the first connecting shaft 61, and the second connection positioning shoulder 621 may also be formed on an inner peripheral surface of the second connecting shaft 62.

If an internal space of the rotational joint is sufficient, an additional module positioning shoulder 612 may also be formed on the outer peripheral surface of the first connecting shaft 61. For example, the additional module positioning shoulder 612 may be used to mount a brake module on the outer peripheral surface of the first connecting shaft 61. In an embodiment, the brake module may be mounted between the additional module positioning shoulder 612 and the encoder assembly 30 to brake the outer shaft 11.

In the embodiment shown in FIG. 1 to FIG. 5, the second connecting shaft 62 is a hollow shaft, and a hollow portion thereof is configured to allow a wire harness to extend through, so that the second connecting shaft 62 can be used as the wire passing shaft of the joint. In the case that the wire harness in the joint does not need to extend through the second connecting shaft 62, the second connecting shaft 62 may also be a solid shaft. In the embodiment of the present application, the second connecting shaft 62 may not be used to output torque, but only used to assist in measuring the rotational speed of a rotating shaft of the transmission device, or used as the wire passing shaft.

In addition, a disassembly auxiliary shoulder 622 may be formed on the inner peripheral surface of the second connecting shaft 62. The disassembly auxiliary shoulder 622 serves to assist an operation of detaching the second connecting shaft 62 from the inner shaft 12. Specifically, the second connecting shaft 62 can be separated from the inner shaft 12 by inserting a stepped shaft dedicated to disassembly from the side where the first end of the second connecting shaft 62 is located to abut against the auxiliary shoulder 622 and push the second connecting shaft 62.

The first connecting shaft 61 may be driven to rotate by the motor of the driving device, and may be used as the driving shaft of the joint or be connected to or integrally formed with the driving shaft of the joint, that is, a rotational speed of the first connecting shaft 61 is a rotational speed of the driving shaft of the joint. The second connecting shaft 62 may be driven by the transmission device, and connected to the output shaft of the joint or integrally formed with the output shaft of the joint. That is, an output shaft of the transmission device can be used as the output shaft of the joint, the second connecting shaft 62 rotates synchronously with the output shaft of the joint, and a rotational speed of the second connecting shaft 62 is a rotational speed of the output shaft of the joint. In the above embodiments, the first connecting shaft 61 can rotate synchronously with the driving shaft of the rotational joint, and the second connecting shaft 62 can rotate synchronously with the output shaft of the rotational joint, but it should be noted that the present application is not limited thereto. If the structure of the driving device allows, the first connecting shaft 61 can rotate synchronously with the output shaft of the rotational joint, and the second connecting shaft 62 can rotate synchronously with the driving shaft of the rotational joint.

In some embodiments, the output shaft of the joint and the driving shaft of the joint (for example, a motor shaft of the rotational joint) may be located on two sides of the driving device, respectively. In the embodiments shown in FIGS. 1 to 5, an extension direction of the second connecting shaft 62 and the first connecting shaft 61 is an extension direction of the driving shaft of the joint (e.g., the shaft of the motor of the joint). In addition, in the axial direction, a position of the second end of the second connecting shaft 62 does not exceed a position of the second end of the first connecting shaft 61. The second end of the first connecting shaft 61 and the second end of the second connecting shaft 62 are configured to mount the disk assemblies 31 and 32 of the encoder assembly 30, respectively, so that encoder modules or the encoder assemblies mounted to the two connecting shafts can be mounted compactly on the same side of the driving device in the axial direction, which is beneficial to reduce an axial space occupied and involved by the encoder module in the joint. Those skilled in the art should understand that the axial space involved may be a necessary avoidance space, for example, it may be a space reserved in consideration of heat dissipation, vibration, or wiring.

As shown in FIG. 2, at any position in the axial direction of the first connecting shaft 61 and the second connecting shaft 62, the outer diameter of the second connecting shaft 62 is less than the inner diameter of the first connecting shaft 61, so that the two are radially spaced apart without direct contact with each other. Therefore, the rotation of the first connecting shaft 61 and the rotation of the second connecting shaft 62 are relatively independent, that is, the rotation of the first connecting shaft 61 will not interfere with the rotation of the second connecting shaft 62, and the rotation of the second connecting shaft 62 will not interfere with the rotation of the first connecting shaft 61. Therefore, the rotational speed of the first connecting shaft 61 and the rotational speed of the second connecting shaft 62 can respectively represent the rotational speed of the driving shaft of the joint and the rotational speed of the output shaft of the joint. When the two encoder assemblies are used to measure the rotational speed of the first connecting shaft 61 and the rotational speed of the second connecting shaft 62, respectively, the actual conditions of the rotational speed of the driving shaft of the joint and the rotational speed of the output shaft of the joint can be accurately reflected.

In the embodiment shown in FIGS. 2 to 5, although the rotational speed of the first connecting shaft 61 and the rotational speed of the second connecting shaft 62 represent the rotational speed of the driving shaft of the joint and the rotational speed of the output shaft of the joint, respectively, the present application is not limited thereto. That is, in an output structure of the driving device, e.g., if the structure of the motor and the structure of the transmission device allow, the first connecting shaft 61 may also be arranged to rotate synchronously with the output shaft of the joint, while the second connecting shaft 62 may be arranged to rotate synchronously with the driving shaft of the joint (e.g., the shaft of the motor of the joint).

In addition, as mentioned above, in the embodiment of the present application, a transmission ratio of the transmission device in the driving device may be greater than or equal to 1, and may also be less than or equal to 1. That is, the transmission device may be a reducer, or a speed-up device, or even a speed-change device with both speed-up and speed-down transmission capabilities as needed. Therefore, a ratio of the rotational speed of the driving shaft of the joint to the rotational speed of the output shaft of the joint may be greater than or equal to 1, and may also be less than or equal to 1.

As mentioned above, the encoder assembly 30 includes the disk assembly and the sensor assembly. The mounting structure of the encoder assembly 30 in the joint according to the embodiment of the present application will be described in details below with reference to FIGS. 1 to 5.

As shown in FIGS. 1 to 5, the encoder assembly 30 includes the first disk assembly 31 mounted on the first connecting shaft 61 and the second disk assembly 32 mounted on the second connecting shaft 62. The first disk assembly 31 includes a first disk 311 and a first mounting bracket 312 configured to mount the first disk 311. The first mounting bracket 312 is an annular member provided with an inner hole, and is sleeved and fixed on the second end of the first connecting shaft 61 through the inner hole. In order to ensure firm mounting, the first mounting bracket 312 and the first connecting shaft 61 may be preferably connected by an interference fit.

An outer ring of the first disk 311 may be fixed to a ring portion of the first mounting bracket 312 using threaded fasteners such as screws. Therefore, when the first connecting shaft 61 rotates, the first disk assembly 31 including the first mounting bracket 312 and the first disk 311 rotates synchronously with the first connecting shaft 61. That is, the rotational speed of the first disk 311 is the rotational speed of the driving shaft of the joint. In a further embodiment, the first connecting shaft 61 and the first mounting bracket 312 may be formed as an integral member.

The second disk assembly 32 includes a second disk 321 and a second mounting bracket 322 configured to mount the second disk 321. The second mounting bracket 322 is an annular member provided with an inner hole, and is sleeved and fixed on the second end of the second connecting shaft 62 through the inner hole. In order to ensure firm mounting, the second mounting bracket 322 and the second connecting shaft 62 may be preferably connected by an interference fit. An outer ring of the second disk 321 may be fixed to a ring portion of the second mounting bracket 322 using threaded fasteners such as screws. Therefore, when the second connecting shaft 62 rotates, the second disk assembly 32 including the second mounting bracket 322 and the second disk 321 rotates synchronously with the second connecting shaft 62. That is, the rotational speed of the second disk 321 is the rotational speed of the output shaft of the joint. In a further embodiment, the second connecting shaft 62 and the second mounting bracket 322 may also be formed as an integral member.

In this embodiment, a distance between a position where the first mounting bracket 312 is mounted on the first connecting shaft 61 and an end surface of the first disk 311 is greater than a distance between a position where the second mounting bracket 322 is located on the second connecting shaft 62 and an end surface of the second disk 321. The first mounting bracket 312 may include a first disk mounting portion, a first connecting shaft mounting portion provided with an inner hole, and a connecting portion connecting the two. As shown in FIGS. 1 to 3, the connecting portion can be formed as an inclined portion to reserve a mounting space for the second mounting bracket 322 in the axial direction, so as to prevent any axial or radial interference between the first mounting bracket 312 and the second mounting bracket 322 from affecting the rotational speed of the disk or magnetic field interference between the two disks. An angle of inclination of the connecting portion may be greater than or equal to 90 degrees. In addition, the connecting portion may also be formed in a curved shape.

In this embodiment, although the first disk 311 and the second disk 321 are mounted on the first connecting shaft 61 and the second connecting shaft 62 by the first mounting bracket 312 and the second mounting bracket 322, respectively, those skilled in the art should be understood that, for example, if a size of the inner hole of the second disk 321 is appropriate, it may be considered that the second disk 321 is directly mounted on the second connecting shaft 62. That is, the manner in which the first disk 311 and the second disk 321 are fixedly connected to the first connecting shaft 61 and the second connecting shaft 62 respectively is not limited to the manner described above, as long as it can ensure that the first disk 311 and the second disk 321 rotate synchronously with the first connecting shaft 61 and the second connecting shaft 62 respectively, any mounting structure is allowed.

Furthermore, the first disk 311 and the second disk 321 being mounted as coplanar is more conducive to reducing the axial space occupied or involved by the encoder assembly 30 in the joint. As shown in FIGS. 2 and 3, the first disk 311 may be located radially outside the second disk 321, and the first disk 311 and the second disk 321 may be spaced apart in the radial direction to prevent magnetic field interference between the two that may cause distortion of the electrical signal received by the corresponding sensor assembly.

As aforementioned, the encoder assembly 30 further includes the first sensor assembly mounted adjacent to the first disk 311 and the second sensor assembly mounted adjacent to the second disk 321. The first sensor assembly is configured to detect a rotational movement of the first disk 311, and the second sensor assembly is configured to detect a rotational movement of the second disk 321. Although not explicitly shown, both the first sensor assembly and the second sensor assembly are mounted on a PCB circuit board 50 which will be described in details below. That is, the first sensor assembly (in particular, a sensor of the first sensor assembly) may face the first disk 311, and the second sensor assembly (in particular, a sensor of the second sensor assembly) may face the second disk 321. The first sensor assembly generates a digital signal about the rotational speed of the first connecting shaft 61 based on the electrical signal generated by the rotation of the first disk 311, and the second sensor assembly generates a digital signal about the rotational speed of the second connecting shaft 62 based on the electrical signal generated by the rotation of the second disk 321. The control device of at least one of the joint, the robotic arm and the robot can receive the digital signals from the first sensor assembly and the second sensor assembly, so as to perform feedback control or adjustment control on the driving device of the joint as needed, thereby precisely controlling the specific movement of the joint and the robotic arm or robot having the joint.

In the above embodiment, the first sensor assembly and the second sensor assembly are mounted on the same PCB circuit board 50, which not only improves the integration of the circuit, saves the occupied space and avoidance space of the PCB circuit board, but also reduces heat dissipation problem, reduces a length of the wire harness and simplifies the connection of the wire harness.

As shown in FIGS. 1 and 2, the PCB circuit board 50 is mounted parallel to the first disk 311 and the second disk 321, and is fixedly connected to an end of the joint housing through the connection assembly 40. The connection assembly 40 is located between an end of the joint housing and the PCB circuit board 50, one end of connection assembly 40 is connected to an end of the joint housing, and the other end of the connection assembly 40 is connected to the PCB circuit board 50, and a certain distance is maintained between the PCB circuit board 50 and the end of the joint housing. The certain distance is slightly greater than designed extension lengths of the first disk assembly 31 and the second disk assembly 32 relative to an end of the joint housing. When the two sensor assemblies are mounted on the PCB circuit board 50, it is necessary to ensure that a suitable gap is maintained between the end surfaces of the first disk assembly 31 and the second disk assembly 32 and the sensor assembly located on the PCB circuit board 50, so that the first sensor assembly and the second sensor assembly can accurately detect the rotational speeds of the first disk 311 and the second disk 321. In an embodiment according to the present application, the designed extension length may be greater than a thickness of the disk assembly (i.e., a total thickness of the first disk assembly and the second disk assembly). In the present application, the thickness of the disk assembly may refer to a distance between a surface of the disk assembly and a rear surface of its mounting bracket, and the disk assembly can be detached by clamping the thickness of the disk assembly. In other words, the thickness of the disk assembly refers to a thickness that can be clamped at the outer periphery of the disk assembly. As shown in FIG. 2, for a disk assembly in the present application that includes both a first disk assembly 31 and a second disk assembly 32 arranged in a coplanar manner, the thickness of the disk assembly refers to the thickness of the first disk assembly 31 located radially outside.

When mounting the first disk assembly 31 and the second disk assembly 32, the first connecting shaft 61 is first mounted to the outer shaft 11, so that the tail end of the outer shaft 11 abuts against the first connection positioning shoulder 611, and then the second connecting shaft 62 is connected to the inner shaft 12, so that the tail end of the inner shaft 12 abuts against the second connection positioning shoulder 621, and then the inner ring of the bearing 70 is applied with 609 glue and press-fitted between the first connecting shaft 61 and the second connecting shaft 62. The first disk 311 is then mounted on the first mounting bracket 312 to form the first disk assembly 31, and the second disk 321 is mounted on the second mounting bracket 322 to form the second disk assembly 32. The first disk assembly 31 is sleeved on the first connecting shaft 61, and the second disk assembly 32 is sleeved on the second connecting shaft 62. Then the two disk assemblies 31 and 32 are simultaneously press-fitted in the axial direction to the first connecting shaft 61 and the second connecting shaft 62 connected to the inner shaft 12 and the outer shaft 11 of the driving device, respectively, using a disk press-fit fixture 14 such as the one shown in FIG. 3. Press-fitting the two disk assemblies 31 and 32 simultaneously using the disk press-fit fixture 14 can ensure that the distance from the end surfaces of the two disks (that is, the disk surfaces facing the PCB circuit board 50 or facing the sensor assembly) to the end surface of the joint housing and the coplanarity of the two disks (i.e., the disk surfaces) meets the requirements.

After the disk assembly is mounted in place, the disk press-fit fixture 14 is removed, the PCB circuit board 50 is then secured (for example, it is fixed to the joint housing or the driving device) using the connection assembly 40 and the gap between the PCB circuit board 50 and the end surfaces of the two disks (i.e., disk surfaces) is adjusted. By ensuring that the gap between the PCB circuit board 50 and the end surfaces of the two disks is appropriate, each sensor assembly can accurately detect the change in the magnetic field of the corresponding disk assembly due to rotation, thereby outputting a digital signal about the rotational speed of the corresponding connecting shaft signal, thereby obtaining information about the rotational speeds of the driving shaft of the rotational joint and the output shaft of the rotational joint. After the encoder module is mounted in place, as shown in FIG. 1 and FIG. 2, the encoder module or encoder assembly can be mounted to extend a predetermined length relative to an end of the joint housing, so as to facilitate subsequent disassembly of the encoder module.

The connection assembly 40 may include spacer posts, such as cylindrical or hexagonal spacer posts. Each end of each spacer post may be formed with an internal thread or an external thread. One end of the spacer post may be threadedly connected to an end of the joint housing, and the other end of the spacer post may be threadedly connected to the PCB circuit board 50. Specifically, one end of the spacer post may be connected to at least one of an inner wall, an outer wall, or end surface of an end of the joint housing, and the other end of the spacer post may be connected to the PCB circuit board 50 through another screw, bolt or nut. When one end of the spacer post is connected to the inner or outer wall of an end of the joint housing, a corresponding inner or outer protrusion can be formed on the inner or outer wall of the joint housing. A through hole or a threaded hole may be formed in the inner or outer protrusion for connection. At least two connecting assemblies 40 are provided, for example, 3, 4, 5, 6 or more. The number of connecting assembly 40 may be determined according to the size of the joint housing, the shape and weight of the PCB circuit board, and the specification of the spacer post.

The connection assembly 40 is not limited to a spacer post having internal or external threads at both ends thereof. For example, the connection assembly 40 may further include at least one boss extending axially from at least one of the inner wall, outer wall and/or end surface of an end of the joint housing and threaded fasteners threadedly connected to the at least one boss. The boss extends a predetermined distance with respect to an end of the joint housing and is integrally formed with the joint housing, and a threaded hole is formed in the boss. The PCB circuit board 50 is connected and fixedly connected to the joint housing through a combination of the threaded fastener and the boss, which allows the PCB circuit board 50 to be fixed to the joint housing in a manner spaced apart from an end of the joint housing by a predetermined distance.

As shown in FIG. 2, the PCB circuit board 50 has a central hole 51 for a cable or a wire harness to extend through. The tail end of the second connecting shaft 62 does not extend to the PCB circuit board 50 or extend through the PCB circuit board 50, but is spaced apart from the PCB circuit board 50 in the axial direction of the driving device and is coplanar with the disk surface of the disk assembly. It can be seen from the foregoing description that the first mounting bracket 312 and the second mounting bracket 322 are located on one side of the first disk and the second disk and are axially connected to them without gaps, and the PCB circuit board 50 is located on the other side of the first disk and the second disk and is axially spaced apart therefrom. Through the compact arrangement of the PCB circuit board and the first disk assembly and the second disk assembly mounted on the first connecting shaft 61 and the second connecting shaft 62 respectively, the axial space occupied by the encoder module in the rotational joint can be effectively reduced.

In an embodiment, the connection assembly 40 may be a spacer post, or a boss and a threaded fastener, and the two types of connection assemblies may be simultaneously applied to a connection between the PCB circuit board 50 and an end of the joint housing 20 in one joint.

In order to facilitate assembly and disassembly, the spacer post may be a hexagonal stud with an external thread at one end thereof and an internal thread at the other end thereof. One end of the hexagonal stud can be screwed into the end surface of an end of the joint housing, while the other end of the hexagonal stud is configured to allow a through-hole screw on the PCB circuit board 50 to extend through. By adjusting a screw-in depth of the end of the hexagonal stud, a distance between the PCB circuit board 50 and the end of the joint housing can be adjusted, so as to adjust the gap between the disk assembly and the sensor assembly.

In the above embodiment, when disassembling the encoder module, the PCB circuit board 50 can be removed first, and then the first disk assembly 31 and the second disk assembly 32 can be simultaneously removed from the first connecting shaft 61 and the second disk assembly 32 respectively, by a disk removal fixture. The second connecting shaft 62 and the bearing 70 are then removed simultaneously using the aforementioned stepped shaft, and finally the first connecting shaft 61 is removed.

In the embodiment of the present application, a step (that is, a shaft shoulder) configured to mount the bearing is formed at the tail end of the first connecting shaft and the tail end of the second connecting shaft immediately adjacent to the disk mounting bracket, thereby ensuring the coaxiality of the two slender shafts extending from the driving device in the joint housing and the rigid supporting ability of the two shafts without hindering the independent rotation of the two shafts. The concentric mounting of the encoder module and the driving shaft and the output shaft of the rotational joint is ensured, and the asymmetry or angle error is avoided. The above structure also improves the robustness of the encoder module against shock and vibration. Meanwhile, the end surfaces of the second ends of the two connecting shafts are respectively coplanar with the corresponding disk surfaces, which minimizes the length of the slender shafts, reduces the difficulty of product processing, and simplifies the mounting and adjustment of the encoder module.

In addition, the mounting of the bearings of the encoder module, an input disk bracket, and an output disk bracket can be mounted by combining step shaft positioning and interference press fit while applied with adhesive, which simplifies the assembly structure of the encoder module, thereby further facilitating assembly and disassembly.

In the embodiment of the present application, the specific position of the end of the joint housing connected to the connecting assembly can be reasonably selected according to the size and structure of the joint housing, the size and structure of the PCB circuit board, and the size of the first disk assembly in the encoder assembly, and is not limited to a certain fixed position.

According to at least one embodiment of the present application, the connection manner between the PCB circuit board and the joint housing not only facilitates the assembly and disassembly of the PCB circuit board and the encoder assembly, but also facilitates the adjustment of the gap between the sensor assembly on the PCB circuit board and the end surface of the disk in the encoder assembly, thereby further improving the assembly efficiency of the joint.

In addition, the input disk and output disk (that is, the first disk and the second disk) in the encoder module of the joint are arranged on the same end surface and only one PCB circuit board is used, which can make full use of the radial space, greatly save the axial space of the joint, and improve the system integration, which is helpful to the miniaturization design of the product. At the same time, the two disks can be mounted, adjusted, and removed at the same time, the same fixture is used, which improves the mounting accuracy and efficiency.

In addition, the adjustment of the gap between the disk and the sensor on the PCB circuit board is further simplified by centralizing the encoder modules for the driving shaft (e.g., the shaft of the motor of the joint) and the output shaft of the joint at an end of the joint housing (because the requirement of the gap between the disk and the sensor is very strict). The above arrangement can be precisely pressed with a disk mounting fixture, so that the need for gap adjustment is reduced, and such encoder module structure is more suitable for harsh industrial environments with extreme temperature, humidity and particle pollution.

In the description of the present application, it should be understood that the terms “center”, “longitudinal”, “transverse”, “length”, “width”, “thickness”, “upper”, “lower”, “front”, “rear”, “left”, “right”, “vertical”, “horizontal”, “top”, “bottom”, “inner”, “outer”, “clockwise”, “counterclockwise”, “axial”, “radial”, “circumferential direction” are based on the azimuth or position relationship shown in the attached drawings, which are only for the convenience of describing the present application and simplifying the description, rather than indicating or implying that the device or element must have a specific azimuth, be constructed and operated in a specific azimuth, so such terms cannot be understood as a limit to the present application.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include at least one of the features. In the description of the present application, "multiple" means at least two, such as two, three, etc., unless otherwise expressly and specifically limited.

In the present application, unless otherwise expressly specified and limited, the terms "mount", "connect", "contact", "fix" and other terms should be understood in a broad sense, for example, they can be fixed connections, removable connections, or integrated. They can be mechanical connection or electrical connection. They can be directly connected or indirectly connected through an intermediate medium. They can be the connection within two elements or the interaction relationship between two elements, unless otherwise expressly limited. For those skilled in the art, the specific meaning of the above terms in the present application can be understood according to the specific situation.

In the present application, unless otherwise expressly specified and limited, the first feature being "above" or "below" the second feature may means that the first feature is in direct contact with the second features, or the first and second features may be in indirect contact through an intermediate medium. Moreover, the first feature being "on", "over" and "above" the second feature may means that the first feature is directly above or diagonally above the second feature, or it only means that the horizontal height of the first feature is higher than the second feature. The first feature being "under", "underneath" and "below" of the second feature may means that the first feature is directly below or obliquely below the second feature, or simply means that the horizontal height of the first feature is less than that of the second feature.

It should be noted that when an element is said to be "fixed to" or "provided on" another element, it can be directly on another element or there can be a centered element. When an element is considered to be "connected" to another element, it can be directly connected to another element or there may be intermediate elements at the same time. The terms "vertical", "horizontal", "up", "down", "left", "right" and similar expressions used herein are for the purpose of illustration only and do not represent the only embodiment.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A rotational joint, comprising a joint housing, a driving device mounted in the joint housing, and an encoder module mounted on the driving device, the driving device comprising an inner shaft and an outer shaft surrounding the inner shaft and radially spaced apart from the inner shaft, wherein the encoder module comprises:

- a first disk assembly configured to rotate synchronously with the outer shaft;
- a second disk assembly configured to rotate synchronously with the inner shaft;
- a first sensor assembly disposed adjacent to the first disk assembly to detect movement of a disk of the first disk assembly; and
- a second sensor assembly disposed adjacent to the second disk assembly to detect movement of a disk of the second disk assembly;
- wherein a disk surface of the first disk assembly and a disk surface of the second disk assembly are arranged to be coplanar and radially spaced apart by at least a predetermined distance;
- wherein the driving device comprises a motor and a transmission device driven by the motor, wherein the motor drives one of the inner shaft and the outer shaft, the transmission device drives the other of the outer shaft and the inner shaft, wherein the driving device is mounted in the joint housing, and the encoder module extends a predetermined length relative to an end of the joint housing, so as to be removed from the driving device.

2. The rotational joint according to claim 1, further comprising a control device configured to adjust an operation of the driving device based on signals output by the first sensor assembly and the second sensor assembly.

3. The rotational joint according to claim 1, wherein the encoder module further comprises:

- a first connecting shaft having a first end and a second end, the first end of the first connecting shaft being configured to be connected to a tail end of the outer shaft;
- a second connecting shaft having a first end and a second end, the first end of the second connecting shaft being configured to be fixedly connected to the inner shaft; and
- a bearing mounted between the first connecting shaft and the second connecting shaft;
- wherein the first disk assembly is fixed to the first connecting shaft, and
- wherein the second disk assembly is fixed to the second connecting shaft.

4. The rotational joint according to claim 3, wherein the first connecting shaft is a hollow shaft and a first bearing positioning shoulder is formed on an inner periphery surface of the first connecting shaft, and/or a second bearing positioning shoulder is formed on an outer periphery surface of the second connecting shaft.

5. The rotational joint according to claim 4, wherein a first connection positioning shoulder is formed on an inner peripheral surface of the first end of the first connecting shaft or an outer peripheral surface of the first end of the first connecting shaft, and is configured to position a mounting position of the first connecting shaft relative to the outer shaft.

6. The rotational joint according to claim 4, wherein an additional module positioning shoulder is formed on the outer peripheral surface of the first connecting shaft.

7. The rotational joint according to claim 4, wherein a second connection positioning shoulder is formed on the outer peripheral surface of the second connecting shaft or an end surface of the first end of the second connecting shaft, and is configured to position a mounting position of the second connecting shaft relative to the inner shaft.

8. The rotational joint according to claim 4, wherein the inner shaft is a hollow shaft and extends a certain length from the outer shaft, the second connecting shaft is a hollow shaft, a second connection positioning shoulder and/or a disassembly auxiliary shoulder is formed on the inner peripheral surface thereof, the second connection positioning shoulder is configured to position a mounting position of the second connecting shaft relative to the inner shaft, and the disassembly auxiliary shoulder is configured to separate the second connecting shaft from the inner shaft.

9. The rotational joint according to claim 3, wherein an end surface of the second end of the first connecting shaft is coplanar with an outer end surface of the bearing, and an end surface of the second end of the second connecting shaft is coplanar with the disk surface of the first disk assembly and the disk surface of the second disk assembly.

10. The rotational joint according to claim 3, wherein the bearing is bonded to at least one of the first connecting shaft and the second connecting shaft by an adhesive.

11. The rotational joint according to claim 3, wherein the first disk assembly comprises a first disk and a first mounting bracket supporting the first disk, the first mounting bracket is mounted to the second end of the first connecting shaft, wherein the second disk assembly comprises a second disk and a second mounting bracket supporting the second disk, and the second mounting bracket is mounted to the second end of the second connecting shaft.

12. The rotational joint according to claim 1, wherein the encoder module further comprises a PCB circuit board on which the first sensor assembly and the second sensor assembly are mounted, wherein the PCB circuit board is parallel to and spaced apart from the disk surface of the first disk assembly and the disk surface of the second disk assembly.

13. The rotational joint according to claim 12, wherein the PCB circuit board is fixed to at least one of an inner wall, an outer wall, and an end surface of an end of the joint housing, and the PCB circuit board is spaced apart from the end of the joint housing by a predetermined distance.

14. The rotational joint as claimed in claim 13, wherein the predetermined distance is at least greater than a total thickness of the first disk assembly and the second disk assembly.

15. The rotational joint according to claim 13, wherein the PCB circuit board is directly fixed to the joint housing through at least one spacer post, and each end of each spacer post is formed with an internal thread or an external thread.

16. The rotational joint according to claim 13, wherein the joint housing comprises at least one boss provided on at least one of an inner wall, an outer wall and/or an end surface of the end of the joint housing and a threaded fastener threaded to the boss, the one boss extends a predetermined distance relative to the end of the joint housing, and each boss is provided with a threaded hole, and the PCB circuit board is connected and fixed to the joint housing through a combination of the threaded fastener and the boss.

17. The rotational joint as claimed in claim 13, wherein the PCB circuit board has a central hole for a cable to extend through.

18. The rotational joint according to claim 12, wherein the first sensor assembly and/or the second sensor assembly comprise a sensor and a conditioning circuit integrated into a chip, wherein the sensor is a Hall sensor or a giant magnetoresistive sensor.

19. A device comprising at least one rotational joint according to claim 1.

* * * * *